3,734,831
PRODUCTION OF CELLULASE
Michael Anthony Hulme, Ottawa, Ontario, Canada, assignor to Canadian Patents and Development Limited, Ottawa, Ontario, Canada
No Drawing. Filed Nov. 27, 1970, Ser. No. 93,506
Int. Cl. C07g 7/02
U.S. Cl. 195—66 R      8 Claims

ABSTRACT OF THE DISCLOSURE

In a process for producing cellulase in a submerged culture containing a cellulase synthesizing fungus and nutrients including an assimilable carbon source material, the improvement comprising regulating the amount of assimilable carbon source material in said culture medium so as to maintain its concentration at a stage of imminent exhaustion so as to maximize cellulase production.

---

This invention relates to a process for preparing cellulase and in particular it relates to such a process which can be carried out continuously and which provides a very active enzyme as compared with other known processes.

BACKGROUND OF THE INVENTION

Cellulases are enzymes produced by fungi and other organisms. These enzymes are able to depolymerise cellulose, ultimately to glucose. Cellulases when used either alone or in conjunction with other enzymes have a wide range of applications. Uses, both commercial and in the development stages, include use with other enzymes as a digestive aid to relieve flatulence in that they improve gastric emptying by helping to digest meals of high fiber content. Cellulases can also be used to aid in the clarification and extraction of juice and yield a more homogeneous stable juice concentrate. Cellulases also have a considerable effect on paper pulp fibers in that they decrease the necessary beating time and contribute grease resistant properties to the resultant paper. Also, cellulases may be used as a component of enzymatic compositions for septic tanks and they may also be used in drain cleaning products. Also, it is known to feed cellulases to livestock to increase weight gain and feed efficiency. It is also known that cellulase either alone or in admixtures with other enzymes will soften raw food stuffs so that they could replace boiling with its attendant risks of destruction of essential nutrients. For example, they will soften carrots to provide a carrot jam having a high nutritive value; the carrot jam so produced will not need sieving and, therefore, will be obtained in a higher yield. Cellulase has been used to break down cell walls of yeast, cereals, legumes and many vegetables and fruits to enhance digestibility by humans and other animals. Cellulase has also been used to remove fiber from edible oil seed cakes, extract proteins from leaves and grasses, extract essential oils and flavouring compounds from roots, seeds and barks with high fiber content and to obtain higher starch yields from sweet potatoes. Such enzymes will also increase the agar-agar yield from seaweed since methods employing dilute acids or heating partially denature the agar-agar, a drawback not associated with the use of cellulase.

Presently known processes for preparing cellulase from cultures of fungi include the growing of the fungus in a liquid medium containing cellulose or on moist open trays of cellulose and recoving the enzyme from the liquid portion of the culture. The enzyme so prepared is usually obtained as an impure powder. In general, in these known processes, the carbohydrate supply has been cellulosic (U.S. Pats. Nos. 3,310,476 and 3,398,055) but it is also known to utilize other carbohydrate sources such as dextrine (U.S. Pat. 3,232,832).

Insofar as is known, these processes have always been carried out as batch processes with their obvious limitations.

Disadvantages associated with these known processes include the fact that they are time consuming and require days or even weeks to grow the fungus before it begins significant enzyme production. Furthermore, each batch of culture will obviously only produce a limited maximum amount of enzyme and then the culture process must be repeated. The generally necessary presence of cellulosic materials as the carbohydrate source entails heavy enzyme losses since it is well known that cellulases are adsorbed onto cellulose. Also, the commercial cellulase preparations resulting from these known processes have been found to have a limited range of activity against some cellulosic materials, for example, highly crystalline materials have been found to be almost completely resistant to attack by commercial cellulase preparations.

Also utilization of the open tray process leads to contamination and the concurrent production of other enzymes, particularly proteases, and other products which complex with proteins.

SUMMARY OF THE INVENTION

The process of the present invention, which is able to produce cellulase continuously and without using any cellulosic materials as a carbohydrate source, is based upon the discovery that a regulated feed of assimilable carbon source material will result in useful cellulase production from any cellulase synthesizing fungus under certain conditions irrespective of whether the assimilable carbon source material supply is cellulosic. In particular it has been discovered that the carefully controlled feeding of the assimilable carbon source material into a cellulase producing culture containing all the nutrients necessary for growth other than the carbon source, will, while continuously removing excess culture from the fermenter, provide a continuous, high yield source of cellulase even without having any cellulosic material present in the fermenter thereby avoiding a lowering of production of cellulase through the aforementioned adsorption phenomena.

More specifically, and with respect to preferred embodiments of the invention, it has been observed that untreated shake-culture supernatants of cellulolytic fungi grown on glucose as the sole carbon source effect a small but definite depolymerization of carboxymethylcellulose, when assayed viscometrically, and that this depolymerase activity is considerably increased about the time that glucose is exhausted from the culture medium. It is thought that at the time of glucose exhaustion, the endogenous metabolism of the organism was possibly able to support the production of cellulases even in the absence of cellulase and this discovery has been confirmed, as will be exemplified below. That is, it has been discovered that by maintaining a cellulase producing culture at the point of imminent carbon feed exhaustion by growing the organisms in the culture on a limited carbon supply in a stirred, aerated fermenter equipped to dispense a slow steady or incremental feed of fresh carbon supply when nearly all of the original supply has been consumed, it is possible to continuously produce cellulase without using cellulosic materials as the carbohydrate source. Should circumstances warrant the aforementioned disadvantages of a batch process, cellulase can also be obtained by allowing the carbon source material to become exhausted from the culture medium.

In summary, it has been discovered that promotion of cellulase production by limiting the cellulase producing organism's metabolism, results in a practical process for continuously producing cellulase without the use of cellulosic materials as the carbohydrate source, the yield depending upon the precise conditions of the culture.

In carrying out the process of this invention, one can utilize any of the presently known submerged culture processes for producing cellulase utilizing the usual known nutrients and cellulase synthesizing fungi, it being essential only to ensure that an assimilable carbon source material be used and that its feed be regulated so that it is fed slowly and continuously or incrementally through a submerged, stirred aerated culture at a rate to ensure that the carbon source in the culture is always at or close to the stage of imminent exhaustion.

By this is meant that the carbon source material present in the culture is virtually undetectable by normal analysis. For example, where glucose was used as a carbon source material, the stage of imminent exhaustion consistent with significant cellulase yield was when the glucose level was undetectable when its content was estimated by the reducing sugar method of Somogyi, M.J. Biol. Chem., 195, 19 (1952). The limit of detection was 0.01 ml. glucose per ml. of culture.

Obviously, depending upon the actual contents of the culture and the reaction conditions, adjustments in the carbon source material feed will be necessary and such adjustments will be for the purpose of providing optimum yield of the cellulase from the supernatant culture material obtained from the fermenter overflow.

While, as indicated above, any cellulase synthesizing fungus will function in the process of this invention, those which are presently preferred belong to the genera: Myrothecium, Trichoderma, Coniophora and Lenzites. Of these, Trichoderma is a commercially preferred genus and in some cases a Myrothecium would be preferred.

Specifically, *Myrothecium verrucaria, Trichoderma viride, Coniophora puteana* and *Lenzites trabea* are preferred, and of these *Trichoderma viride* is one commercially preferred species and *Myrothecium verrucaria* is also preferable under some conditions.

The carbon source material can be any known to be assimilable by the fungi utilized and includes some carbohydrates. Glucose is presently preferable. Compounds such as glycerol can be used as well as dextrine and should circumstances warrant the resultant disadvantage, a cellulosic material can be used or included.

In carrying out the submerged culture process of this invention, as is normal, aeration and stirring speeds will require regulation to provide optimum yield, and the pH will require careful control. In particular, while aeration must be adequate, excessive aeration will cause greatly reduced yields.

Any of the usual methods for concentration and purification may be used providing precautions to avoid adsorption of the cellulase are carefully observed: filtration (not through cellulose), centrifugation, vacuum evaporation (not over 20° C.) dialysis (not with cellophane) fractional precipitation, chromatography or lyophilisation may all be used.

The following procedure with suitable modifications for large scale operation is preferred. Crude enzyme powder is obtained by removing the mycelium by centrifugation and lyophilising the supernatant; recovery of activity is practically quantitative on redissolving the powder in water. To increase the specific activity of the enzyme preparation a 4 percent aqueous solution of the crude cellulase powder containing 4270 units per g. was prepared and 10 percent (w./v.) solid ammonium sulphate was added with stirring. The solution was cooled to 4° C. for 1 hour and a precipitate which formed was removed by centrifugation. 46 percent (w./v.) of solid ammonium sulphate was added to the supernatant and after storing the solution at 4° C. for 1 hour the precipitate was collected by centrifugation, washed with 56 percent (w./v.) aqueous ammonium sulphate and redissolved in a minimum amount of 0.01 M ammonium acetate buffer solution of pH 5.0. The solution was desalted in the usual way on a G-25 Sephadex (trademark) column and the effluent containing the purified enzyme was lyophilised. This dried powder contained 156,000 units per g. and the recovery of active enzyme was 91 percent (i.e. 34 fold concentration).

Although carboxymethylcellulose was used for routine assays of activity (yield) the cellulase preparation would also attack native cellulose. Dewaxed 60 mesh cotton incubated at 50° C. with a 2.5 percent solution of lyophilised crude enzyme powder containing 4000 units per g. became 9.2 percent water soluble after 40 hours. Paper chromatography of the water soluble products from incubations with ball-milled aspen holocellulose showed that the enzyme attacked both cellulose and hemicellulose: glucose, cellobiose and higher oligomers of glucose, xylobiose, xylotriose and higher oligomers of xylose, mannose and galactose were all identifified.

DESCRIPTION OF PREFERRED EMBODIMENTS

The following are examples of preferred embodiments of the present invention:

EXAMPLES

General

Using a 4 l. fermenter the preferred dilution rate was between 0.1 and 5.0 percent per hr. using a feed containing between 5 and 40 g. per l. of carbohydrate. Preferred aeration levels were between 50 and 500 ml. of air per min. with a stirring speed of 100-500 r.p.m. The carbohydrate content of the fermenter was 1 g. per l. and the supplementary feed was started after 6-24 hr. Cellulase amounts in the medium became significant as soon as growth was limited by the feed rate.

Example 1

Cultures of *Myrothecium verrucaria* were maintained on 1 percent malt-agar slants at 4° C. and sub-cultured every six months. Shake culture inocula were routinely prepared by transferring mycelium and/or spores from a slant grown for 14 days at 28° C., into a shake flask. 250 ml. conical flasks plugged with cotton wool and containing 80 ml. of medium were used to grow the inoculum on a gyratory shaker (120 r.p.m.; 3 inch throw) at 28° C. Media and culture equipment were sterilised by autoclaving at 121° C. for 20 mins. The medium for shake culture growth comprised:

| | | |
|---|---|---|
| Glucose | g | 20.0 |
| $KH_2PO_4$ | g | 2.0 |
| $NaNO_3$ | g | 1.8 |
| Urea | g | 0.3 |
| $MgSO_4 \cdot 7H_2O$ | g | 0.3 |
| $CaCl_2$ | g | 0.3 |
| Yeast extract | g | 0.1 |
| $FeSO_4 7H_2O$ | mg | 5.0 |
| $MnSO_4 H_2O$ | mg | 1.96 |
| $CaCl_2$ | mg | 2.0 |
| $ZnCl_2$ | mg | 1.77 |
| Distilled water | liter | 1 | pH unadjusted at 4.8.

After 2-4 days the mycelium was washed by decantation with sterile distilled water, blended for 10-20 secs. in a Waring Blendor and transferred to a 4 l. glass fermenter containing 3.5 l. of medium similar to that used to grow the inoculum except that the glucose content was reduced to 1 g. per l. The supplementary feed consisting of the same medium as the fermenter, but with 40 g. per l. of glucose was started after 10 hr. at a dilution rate of 0.3 percent per hr.

| Growth period (hr.) | Glucose content of medium (mg./ml.) | Mycelial dry weight (mg./l.) | Cellulase yield [1] (units/mg. mycelium) |
|---|---|---|---|
| 0 | 1.00 | 80 | |
| 17 | 0.88 | 573 | 0.02 |
| 23 | 0.95 | 777 | 0.02 |
| 40 | 1.49 | 1,175 | 0.05 |
| 51 | 1.70 | 1,511 | 0.06 |
| 67 | 0.29 | 2,220 | 0.11 |
| 77 | 0.04 | 2,500 | 0.21 |
| 89 | | 2,804 | 0.40 |
| 101 | | 2,921 | 0.84 |
| 113 | | 3,028 | 1.32 |
| 123 | | 3,114 | 1.61 |
| 136 | | 3,283 | 2.23 |

[1] Cellulase yields were determined viscometrically at 40° C. with an 0.4 percent solution of sodium carboxymethylcellulose in 0.05 M acetate buffer at pH 5.0. Enzyme units were calculated from the initial slope of a plot of flow time of the polymer solution mixed with culture supernatant (which contains cellulase) against the time of incubation and are recorded as the decrease in seconds of flow time per elapsed minutes of incubation. Three ml. of supernatant from the 136 hr. sample contained 22 units of activity and would thus reduce the molecular weight of sodium carboxymethylcellulose (10 ml. of an 0.4 percent solution) from 70,000 to 35,000 in a calculated 94.4 secs. based upon the initial rate of depolymerisation.

Example 2

Following the procedure of Example 1 but using glycerol as the carbohydrate supply substantially the same results were observed relative to cellulase production. A feed containing 2 percent glycerol was started after 6 hr. at a dilution rate of 0.4 percent per hr.

| Growth period (hr.) | Glycerol content of medium (mg./ml.) | Mycelial dry weight (mg./l.) | Cellulase yield (units/mg. mycelium) |
|---|---|---|---|
| 0 | 1.0 | 151 | |
| 25 | 1.6 | 571 | 0.01 |
| 38 | 0.5 | 1,500 | 0.04 |
| 49 | 0.0 | 2,043 | 0.38 |
| 56 | | 2,145 | 0.47 |
| 62 | | 2,356 | 0.57 |

Example 3

Following the procedure of Example 1, but using *Lenzites trabea* to produce cellulase substantially the same results were obtained relative to cellulase production. Since *Lenzites trabea* is unable to utilize $NaNO_3$, $(NH_4)_2SO_4$ was substituted in this case at a concentration of 1.4 g. per l.

The feed containing 0.5 percent glucose was started after 12 hr. at a dilution rate of 1.2 percent per hr.

| Growth period (hr.) | Glucose content of medium (mg./ml.) | Mycelial dry weight (mg./l.) | Cellulase yield (units/mg. mycelium) |
|---|---|---|---|
| 0 | 1.00 | 53 | |
| 17 | 1.02 | 330 | 0.20 |
| 41 | 0.61 | 602 | 0.23 |
| 65 | 0.10 | 986 | 0.27 |
| 89 | 0.01 | 1,010 | 0.40 |
| 116 | | 1,350 | 1.58 |

Example 4

Following the procedure of Example 1, but using *Trichoderma viride* to produce cellulase substantially the same results were obtained relative to cellulase production.

Example 5

Following the procedure of Example 3, but using *Coniophora puteana* to produce cellulase substantially the same results were obtained relative to cellulase production.

I claim:

1. In a process for producing cellulase in a submerged culture containing a cellulase synthesizing fungus and nutrients including assimilable carbon source material able to support cellulase production in said fungus, the improvement comprising selecting the carbon source material from the group consisting of glucose and glycerol and regulating the amount of total assimilable carbon source material in said culture medium so as to allow its concentration to reach a stage of imminent exhaustion so as to maximize cellulase production and repeatedly obtaining or maintaining the stage of emminent exhaustion of total carbon source material.

2. A process for the continuous production of cellulase in a submerged culture containing a cellulase synthesizing fungus and nutrients including assimilable carbon source material able to support cellulase production in said fungus, comprising selecting the carbon source material to comprise glucose or glycerol and regulating through its rate of feed into the culture medium, the total amount of assimilable carbon source material in said culture medium so as to maintain its concentration at a low level which maximizes cellulase production, while simultaneously removing excess culture from the fermenter, and recovering the cellulase from the excess culture.

3. The process of claim 1 wherein the carbon source material comprises glucose.

4. The process of claim 1 wherein the carbon source material is glycerol.

5. The process of claim 1 wherein the cellulase synthesizing fungus is selected from the genera consisting of Myrothecium, Trichoderma, Conionhora and Lenzites.

6. The process of claim 1 wherein the cellulase synthesizing fungus is selected from the group consisting of *Myrothecium verrucaria, Trichoderma viride, Coniophora puteana* and *Lenzites trabea*.

7. The process of claim 1 wherein the cellulase synthesizing fungus consists of *Trichoderma viride*.

8. The process of claim 1, wherein the assimilable carbon source material is allowed to repeatedly become fully exhausted from the culture medium so as to cause the concentration of carbon source material to repeatedly pass through the optimum for cellulase production.

References Cited

Mandels et al.: "J. Bact.," vol. 73, pp. 269–278, 1957.

Reese et al.: "Meth' Carb. Chem.," vol. 3, pp. 139–143, 1963.

Mandels et al.: "Cellulase and Their Applications," ACS, vol. 95, pp. 398–411, 1969.

A. LOUIS MONACELL, Primary Examiner

G. M. NATH, Assistant Examiner

U.S. Cl. X.R.

195—33